(12) United States Patent
Tsai

(10) Patent No.: US 11,617,388 B2
(45) Date of Patent: Apr. 4, 2023

(54) FOOD EXTRUSION TEMPERATURE CONTROLLABLE DEVICE BASED ON MATERIAL AND ENVIRONMENT PROPERTIES

(71) Applicant: FAR EAST UNIVERSITY, Tainan (TW)

(72) Inventor: Jo-Peng Tsai, Tainan (TW)

(*) Notice: Subject to any disclaimer, the term of this patent is extended or adjusted under 35 U.S.C. 154(b) by 0 days.

(21) Appl. No.: 17/502,065

(22) Filed: Oct. 15, 2021

(65) Prior Publication Data
US 2022/0160018 A1  May 26, 2022

(30) Foreign Application Priority Data

Nov. 24, 2020 (TW) ................................. 109141054
Sep. 17, 2021 (TW) ................................. 110134765

(51) Int. Cl.
*A23P 30/20* (2016.01)
*B29C 64/20* (2017.01)
(Continued)

(52) U.S. Cl.
CPC ............ *A23P 30/20* (2016.08); *A21C 15/005* (2013.01); *B29C 64/20* (2017.08); *B29C 64/30* (2017.08);
(Continued)

(58) Field of Classification Search
CPC ..... B29C 64/35; B29C 64/205; B29C 64/209; A23P 30/20; A21C 15/005; A21C 11/16; A21C 9/08; A47J 9/002; A47J 9/005
See application file for complete search history.

(56) References Cited

U.S. PATENT DOCUMENTS

2015/0351416 A1* 12/2015 Bigeard ................. A21D 13/30
                                                      426/549
2016/0038655 A1*  2/2016 Weisman ................. A61L 29/16
                                                      425/375
(Continued)

FOREIGN PATENT DOCUMENTS

CN     206119034 U      4/2017
CN     208228287 U   * 12/2018   .............. A23P 30/20
(Continued)

OTHER PUBLICATIONS

Machine English translation of Chen et al. with TWI510195 (cited on IDS) (Year: 2015).*
(Continued)

*Primary Examiner* — Francisco W Tschen
*Assistant Examiner* — Edgaredmanuel Troche

(57) ABSTRACT

A food extrusion temperature controllable device based on material and environment properties comprises a connecting seat and a temperature controllable device disposed on the connecting seat connecting with a feeding cylinder and a pastry extrusion head. The temperature controllable device comprises a temperature controllable element, a temperature sensor and a thermal insulation jacket. The temperature sensor senses a temperature of a food in the connecting seat, and the temperature controllable element is capable of receiving a temperature controllable command from a controller to adjust the temperature of the food in the connecting seat by heating or cooling. The thermal insulation jacket covers the connecting seat to maintain the temperature. A material removal element is disposed on an inner surface of a chamber of the connecting seat to spray a fluid of liquid and gas sequentially toward a pastry tip of the pastry extrusion head.

12 Claims, 10 Drawing Sheets

(51) Int. Cl.
*B29C 64/30* (2017.01)
*B29C 64/35* (2017.01)
*B29C 64/393* (2017.01)
*B33Y 30/00* (2015.01)
*B33Y 40/00* (2020.01)
*B33Y 50/02* (2015.01)
*A21C 15/00* (2006.01)

(52) U.S. Cl.
CPC ............ *B29C 64/35* (2017.08); *B29C 64/393* (2017.08); *B33Y 30/00* (2014.12); *B33Y 40/00* (2014.12); *B33Y 50/02* (2014.12)

(56) References Cited

U.S. PATENT DOCUMENTS

2016/0135493 A1* 5/2016 Kuo .................. A23P 30/00
425/130
2020/0318679 A1* 10/2020 Van Der Borg ....... B33Y 10/00

FOREIGN PATENT DOCUMENTS

| CN | 208228287 U | 12/2018 |
|---|---|---|
| TW | I510195 | 12/2015 |

OTHER PUBLICATIONS

Machine English translation of Zhong et al. (CN-208228287-U) (Year: 2018).*

* cited by examiner

FOOD EXTRUSION TEMPERATURE CONTROLLABLE DEVICE BASED ON MATERIAL AND ENVIRONMENT PROPERTIES

CROSS-REFERENCE TO RELATED APPLICATION

This application claims priorities from Taiwan Patent Application No. 109141054, filed on Nov. 24, 2020, and Taiwan Patent Application No. 110134765, filed on Sep. 17, 2021, in the Taiwan Intellectual Property Office, the content of which are hereby incorporated by reference in their entirety for all purposes.

BACKGROUND OF THE INVENTION

1. Field of Invention

The invention relates to a food processing device, and more particularly to a food extrusion temperature controllable device based on material and environment properties.

2. Description of the Related Art

At present, the decoration and processing of food surfaces such as cakes and biscuits usually involves filling creamy ingredients such as cream, frosting, chocolate or jam into a pastry bag, and manually extruding the creamy ingredient out of the pastry bag through a conical nozzle to decorate the surface of the food. The food surface is decorated with various designs of patterns, shapes, and texts to increase customers' desire to buy the food. At present, when using the existing computer numerically controlled (CNC) food processor, the pastry extrusion head needs to be replaced frequently during the extrusion process. Therefore, the existing pastry extrusion head placement rack needs to be equipped with a fixing element to fix or loosen the pastry extrusion head in order to install the pastry extrusion head on the feeding cylinder or remove the pastry extrusion head from the feeding cylinder, it will take a great amount of time to replace the pastry extrusion head, and the time of fixing or loosening the pastry extrusion head by the fixing element must be accurately matched with the feeding cylinder, otherwise the pastry extrusion head will easily fall to the outside of the pastry extrusion head placement rack or will skew, causing the manufacturing process to be interrupted. In addition, the existing pastry extruding device cannot adjust the required temperature according to the properties of the food, which often causes the pastry nozzle to be clogged or the extrusion volume is too much and difficult to be controlled. Moreover, food ingredients are likely to remain on the pastry nozzle, resulting in defects in the extruded product, and therefore it requires labor to remove the food ingredients.

SUMMARY OF THE INVENTION

In view of the above, an object of the invention is to provide a food extrusion temperature controllable device based on material and environment properties to solve the above-mentioned problems of the prior art.

In order to achieve the foregoing object, the invention discloses a food extrusion temperature controllable device based on material and environment properties applicable for connecting with a feeding cylinder and a pastry extrusion head of a food processor to adjust a temperature of a food ingredient supplied by the feeding cylinder and to spray the food ingredient from a pastry tip of the pastry extrusion head, the food extrusion temperature controllable device based on material and environment properties comprising: a connecting seat having a chamber, the chamber penetrating a top side and a bottom side of the connecting seat to form a first opening and a second opening respectively; a first connecting element disposed on the top side of the connecting seat, wherein the first connecting element is connected to a third connecting element of the feeding cylinder; a second connecting element disposed on the bottom side of the connecting seat, wherein the food extrusion temperature controllable device based on material and environment properties installs the pastry extrusion head by magnetic attraction between the second connecting element and a fourth connecting element of the pastry extrusion head, or dismounts the pastry extrusion head by demagnetization between the second connecting element and the fourth connecting element of the pastry extrusion head, wherein the connecting seat further comprises an extension plate pivotally connected to a bottom side wall of the connecting seat, the second connecting element is disposed on the extension plate, the fourth connecting element is disposed on a top side wall of the pastry extrusion head, the second connecting element and the fourth connecting element have concave-convex shapes matching with each other to produce a buckling effect; at least one temperature controllable device disposed on the connecting seat for adjusting a temperature of the food ingredient passing through the connecting seat; and a material removal element disposed on an inner surface of the chamber of the connecting seat, the material removal element being used for performing a material removal process to spray a fluid toward the pastry tip of the pastry extrusion head, the fluid being liquid and gas sequentially for easily removing the food ingredient remaining on the pastry tip of the pastry extrusion head and quickly drying the pastry tip of the pastry extrusion head.

Preferably, the temperature controllable device comprises a temperature regulating element composed of a heater and a cooler.

Preferably, the temperature regulating element is electrically connected to an electric power supply source via a conductive circuit of the feeding cylinder.

Preferably, the temperature controllable device further comprises a temperature sensor to detect the temperature of the food ingredient passing through the connecting seat.

Preferably, the temperature controllable element further comprises a thermal insulation jacket used to detachably annularly cover a side wall of the connecting seat.

Preferably, the thermal insulation jacket further covers a side wall of the feeding cylinder and a side wall of the pastry extrusion head annularly.

Preferably, a quantity of the temperature controllable element is more than one, and the temperature controllable elements are disposed on the connecting seat, the feeding cylinder and the pastry extrusion head respectively to adjust temperatures of the food ingredient passing through the connecting seat, the feeding cylinder and the pastry extrusion head.

Preferably, the temperatures of the food ingredient in the connecting seat, the feeding cylinder and the pastry extrusion head are the same or different.

Preferably, the food extrusion temperature controllable device based on material and environment properties of the invention further comprises a heating element disposed on the connecting seat for heating the fluid sprayed by the material removal element.

Preferably, the material removal element is a spray head, an opening direction of a nozzle of the spray head is parallel to a tangential direction of the inner surface of the chamber of the connecting seat and disposed on the inner surface of the chamber of the connecting seat at an included angle facing downward, so that the fluid sprayed toward the pastry tip of the pastry extrusion head forms a fluid vortex that rotates downward along the inner surface of the connecting seat.

In summary, the food extrusion temperature controllable device based on material and environment properties of the invention can have one or more of the following advantages: (1) The pastry extrusion head of various forms can be installed or disassembled more quickly by magnetic attraction to reduce the time required for an overall food preparation. (2) The pastry extrusion head can be easily disposed in the pastry extrusion head placement rack without the need for additionally installing fixing devices. (3) With the pivotally connected extension plate, the connecting seat and the pastry extrusion head can be connected by magnetic attraction and snap-on at the same time. (4) Provided with the spray head capable of spraying liquid and gas for cleaning and drying the pastry extrusion head. (5) Provided with the temperature controllable device capable of adjusting to a required temperature according to food ingredient and environment properties.

In order to enable the examiner to have a further understanding and recognition of the technical features of the invention and the technical efficacies that can be achieved, preferred embodiments in conjunction with detailed explanation are provided as follows.

DETAILED DESCRIPTION OF THE INVENTION

Figure 1:
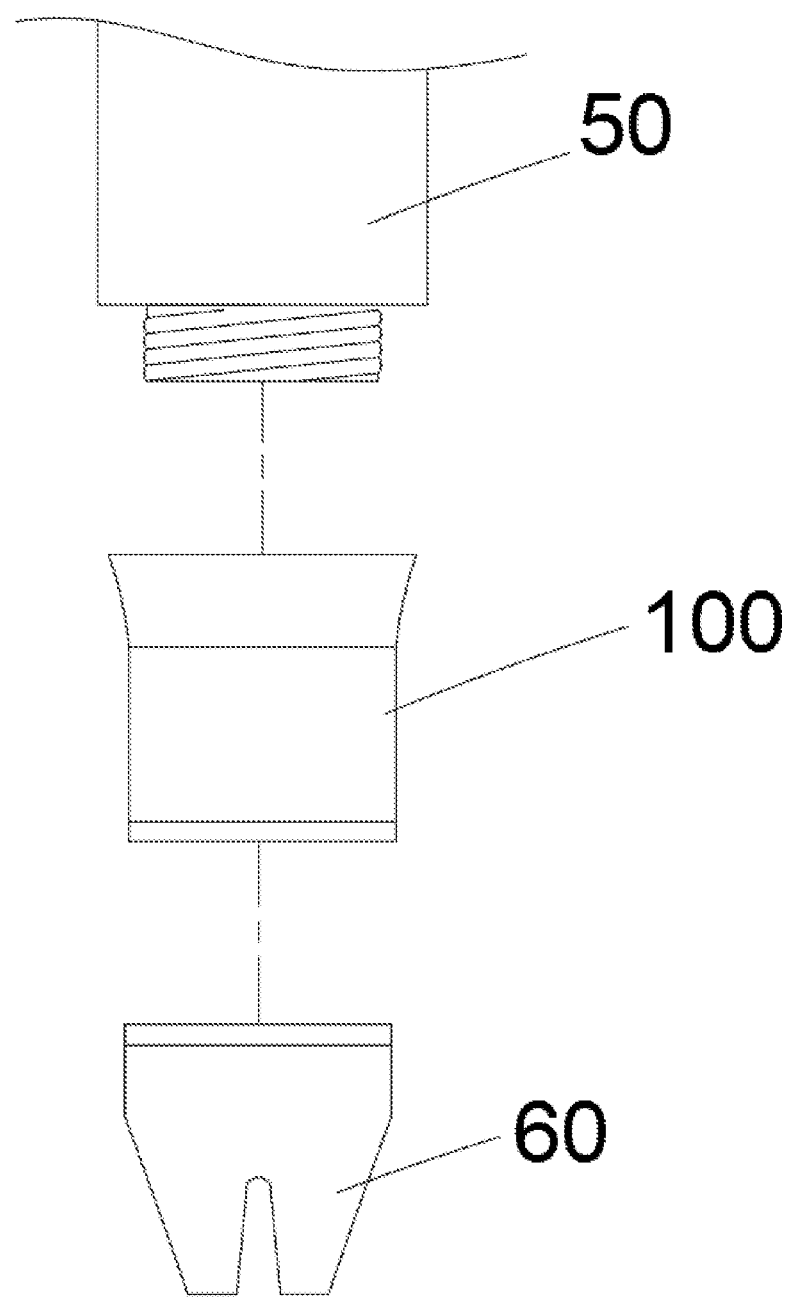
FIG. 1 is a side exploded view of a food extrusion temperature controllable device based on material and environment properties of a first embodiment of the invention connected to a feeding cylinder and an pastry extrusion head.
Figure 2:
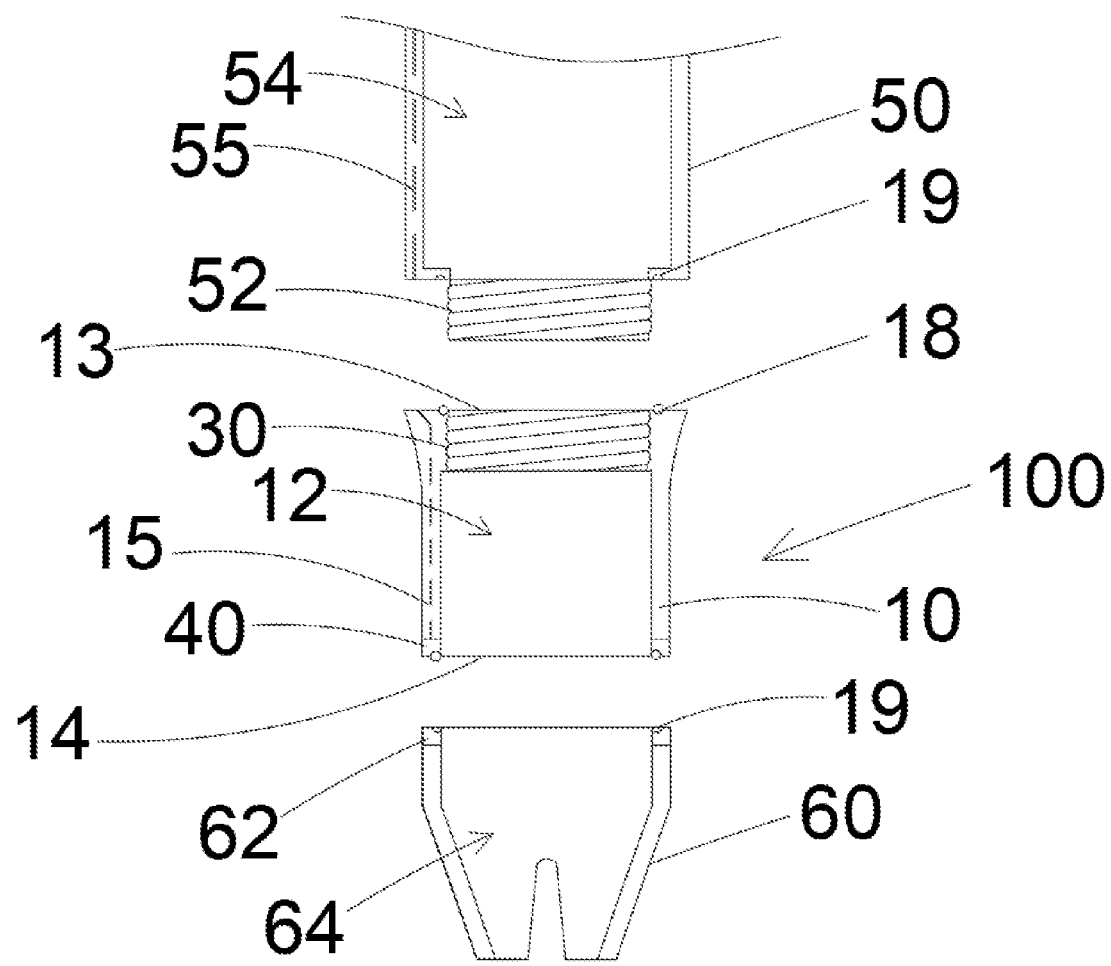
FIG. 2 is a cross-sectional side exploded view of the food extrusion temperature controllable device based on material and environment properties of the first embodiment of the invention connected to the feeding cylinder and the pastry extrusion head.
Figure 3:
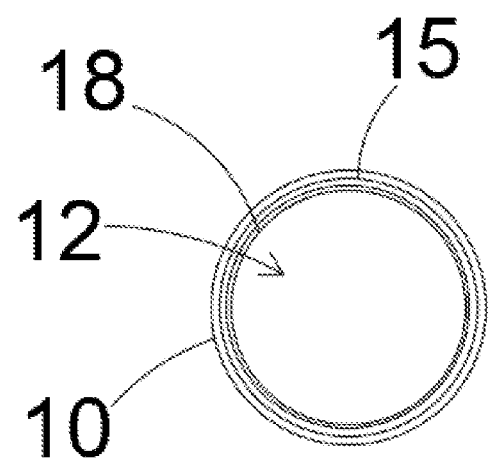
FIG. 3 is a top view of the food extrusion temperature controllable device based on material and environment properties of the first embodiment of the invention.
Figure 4:
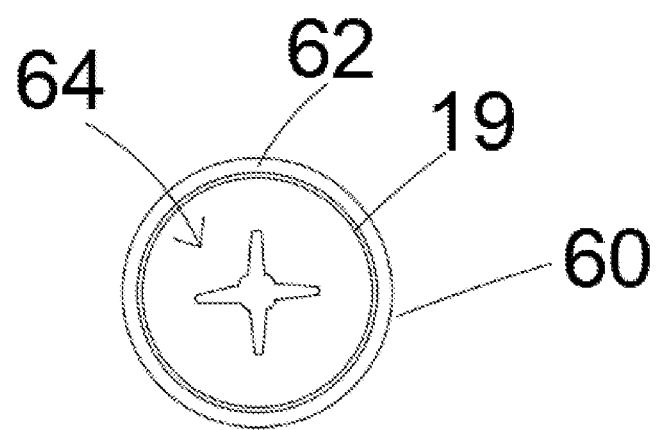
FIG. 4 is a top view of the pastry extrusion head of the first embodiment of the invention.

In order to understand the technical features, content and advantages of the invention and its achievable efficacies, the invention is described below in detail in conjunction with the figures, and in the form of embodiments, the figures used herein are only for a purpose of schematically supplementing the specification, and may not be true proportions and precise configurations after implementation of the invention; and therefore, relationship between the proportions and configurations of the attached figures should not be interpreted to limit the scope of the claims of the invention in actual implementation. In addition, in order to facilitate understanding, the same elements in the following embodiments are indicated by the same referenced numbers. And the size and proportions of the components shown in the drawings are for the purpose of explaining the components and their structures only and are not intending to be limiting.

Unless otherwise noted, all terms used in the whole descriptions and claims shall have their common meaning in the related field in the descriptions disclosed herein and in other special descriptions. Some terms used to describe in the present invention will be defined below or in other parts of the descriptions as an extra guidance for those skilled in the art to understand the descriptions of the present invention.

The terms such as "first", "second", "third", "fourth" used in the descriptions are not indicating an order or sequence, and are not intending to limit the scope of the present invention. They are used only for differentiation of components or operations described by the same terms.

Moreover, the terms "comprising", "including", "having", and "with" used in the descriptions are all open terms and have the meaning of "comprising but not limited to".

Please refer to FIGS. 1 to 4 and 10. In a first embodiment, a food extrusion temperature controllable device 100 based on material and environment properties of the invention is applicable to be installed on a feeding cylinder 50 of a food processor 200, and used to install or dismount a pastry extrusion head 60 disposed in a pastry extrusion head placement rack 210. The food processor 200 is, for example, a CNC food processor capable of performing multiple axis operations. The food extrusion temperature controllable device 100 comprises a connecting seat 10, a first connecting element 30 and a second connecting element 40. Wherein, the first connecting element 30 and the second connecting element 40 are disposed on the connecting seat 10, the connecting seat 10 is, for example, a ring structure with a chamber 12, an interior of the ring structure is preferably hollow, wherein the chamber 12 of the connecting seat 10 penetrates a top side and a bottom side of the connecting seat 10 to form a first opening 13 and a second opening 14 respectively.

Figure 10:
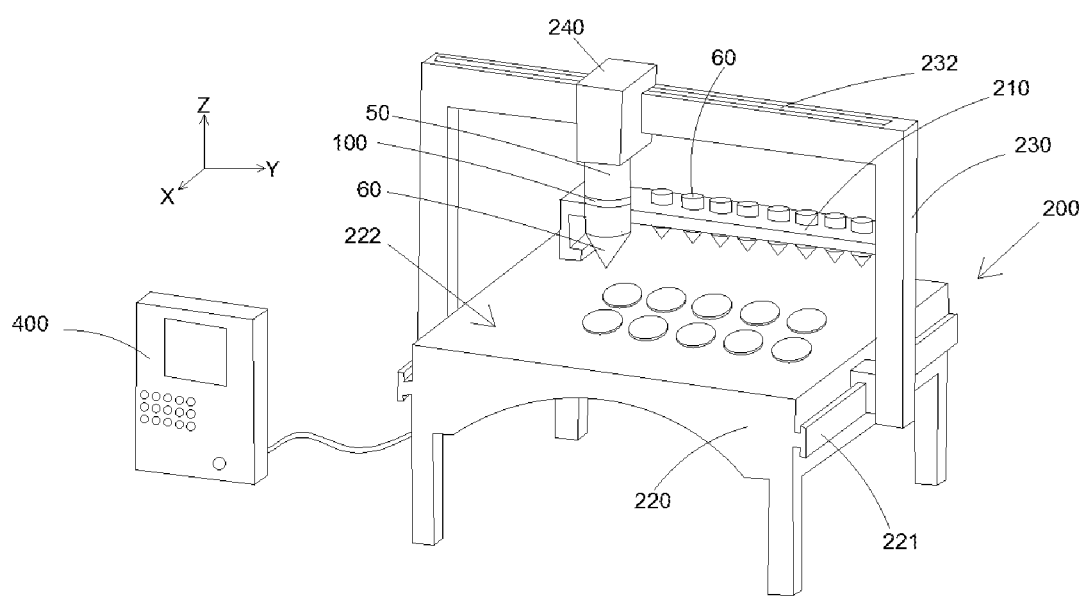
FIG. 10 is a perspective view of the food extrusion temperature controllable device based on material and environment properties of the invention installed on a CNC food processor.

As shown in FIG. 10, the food processor 200 comprises a base 220, a first movable frame 230, a second movable frame 240, the feeding cylinder 50 and a controller 400, wherein the feeding cylinder 50 is disposed on a bottom side of the second movable frame 240, a bottom of the feeding cylinder 50 is provided with the food extrusion temperature controllable device 100 for detachably connecting with the pastry extrusion head 60 for decoration processing. Wherein, the base 220 comprises two lateral sliding rails 221 and a bearing surface 222. Furthermore, a shape of the first movable frame 230 can be, for example, an inverted U-shape, and two ends of the first movable frame 230 are disposed on the lateral sliding rails 221 of the base 220, so that the first movable frame 230 is capable of moving back and forth along the x-axis direction. Wherein, the first movable frame 230 can further comprise an upper sliding rail 232, and the second movable frame 240 can be disposed on the upper sliding rail 232 of the first movable frame 230, so that the second movable frame 240 is capable of moving back and forth along the y-axis direction. In addition, the first movable frame 230 can further comprise rollers to facilitate reciprocating movement on the two lateral sliding rails 221 along the x-axis direction, and the second movable frame 240 can also comprise rollers to facilitate reciprocating movement on upper sliding rail 232 along the y-axis direction. Furthermore, the pastry extrusion head 60 can be, for example, a forward decoration processing pastry extrusion head and/or a lateral decoration processing pastry extrusion head. The pastry extrusion head 60 can be used to contain, for example, viscous, semi-liquid or semi-fluid food ingredients, such as cream, frosting, chocolate, jam or dough, etc., and the feeding cylinder 50 is connected with the second movable frame 240 by screw threads, mortise and tenon or magnetic attraction, so that the pastry extrusion head 60 is capable of reciprocating along the z-axis direction. Wherein, the structure of the food processor 200 is only an example, and is not intended to limit the invention. Since the type and structure of the food processor 200 are not the key points of the invention, any food processor capable of carrying out the food extrusion process can be used as the food processor 200 and should fall within the scope of protection claimed by the invention, so it will not be mentioned here.

In detail, in the food extrusion temperature controllable device 100 of the invention, the first connecting element 30 and the second connecting element 40 are respectively disposed on the top side and the bottom side of the connecting seat 10. Wherein, the top side of the connecting seat 10 is detachably connected to a third connecting element 52 of the feeding cylinder 50 through the first connecting element 30, and a position of the first opening 13 corresponds to an accommodating tank 54 of the feeding cylinder 50, wherein the bottom side of the connecting seat 10 is detachably connected to a fourth connecting element 62 of the pastry extrusion head 60 through the second connecting element 40, and a position of the second opening 14 corresponds to a guide groove 64 of the pastry extrusion head 60. The accommodating tank 54 of the feeding cylinder 50 can be used to store food ingredients, for example, or a top end of the accommodating tank 54 can be connected to a food ingredient supply tank (not shown in the figures), for example, through a feeding pipe. Wherein, the first connecting element 30, for example, is connected to the third connecting element 52 of the feeding cylinder 50 by screw connection, and the second connecting element 40, for example, can be connected to the fourth connecting element 62 of the pastry extrusion head 60 by magnetic connection.

Wherein, either the first connecting element 30 or the third connecting element 52 can be, for example, a male screw thread element, and the other can be a female screw thread element. Either the second connecting element 40 or the fourth connecting element 62 is an electromagnet or an iron plate, the other is an iron plate or a magnet, or both are electromagnets capable of generating opposite magnetisms. If the food extrusion temperature controllable device 100 of the invention is applied to an automated food extrusion system, the feeding cylinder 50, for example, can be installed on a robotic arm, and preferably a multi-axis robotic arm, such as the second movable frame 240 of the CNC food processor 200 in order to meet the requirements of various angles of food extrusion. Moreover, since the invention is detachably connected to the connecting seat 10 and the pastry extrusion head 60 by means of electromagnet magnetic attraction, the invention is capable of accurately and quickly connecting the pastry extrusion head 60 to the connecting seat 10 without installing additional fixing devices in order to greatly reduce the time required to replace the pastry extrusion head 60. Furthermore, the invention only needs to demagnetize the electromagnet to cause the pastry extrusion head 60 drop into the pastry extrusion head placement rack 210, so the pastry extrusion head 60 can be quickly disassembled. In addition, the top side and the bottom side of the connecting seat 10, for example, can be provided with sealing gaskets 18 made of material of silicon rubber, and the pastry extrusion head 60 and the feeding cylinder 50 have sealing grooves 19, and the sealing grooves 19 correspond to the sealing gaskets 18. In this way, the connecting seat 10 can be tightly connected to the pastry extrusion head 60 and the feeding cylinder 50 to prevent the leakage of food ingredients.

For example, in an implementation mode of the first embodiment, the second connecting element 40 is, for example, an electromagnet, and the fourth connecting element 62 of the pastry extrusion head 60 is, for example, an iron material, such as an iron plate. The feeding cylinder 50 and the connecting seat 10 can be respectively disposed with a conductive circuit, a first end of a conductive circuit 15 of the connecting seat 10 is electrically connected to the second connecting element 40, and a first end of a conductive circuit 55 of the feeding cylinder 50 is electrically connected to an electric power supply source. Wherein, in order to make the figures concise, the electric power supply source is not drawn in the figures. When the feeding cylinder 50 is connected to the connecting seat 10, a second end of the conductive circuit 15 of the connecting seat 10 can be in contact with and electrically connected to a second end of the conductive circuit 55 of the feeding cylinder 50, so that the electric power supply source is capable of supplying electric power to the second connecting element 40 on the connecting seat 10 to generate magnetism. When the feeding cylinder 50 is separated from the connecting seat 10, the conductive circuit 15 of the connecting seat 10 is not in contact with and not electrically connected to the conductive circuit 55 of the feeding cylinder 50. In other words, when the second connecting element 40 of the food extrusion temperature controllable device 100 of the invention generates magnetism, the fourth connecting element 62 of the pastry extrusion head 60 to be used can be magnetically attracted. If the pastry extrusion head 60 is to be replaced, electric power can be turned off first, with the second connecting element 40 being demagnetized, the pastry extrusion head 60 to be dismounted can be separated from the second connecting element 40. Then, the food processor 200 moves the food extrusion temperature controllable device 100 to a position above the pastry extrusion head 60 to be used, and then electric power is supplied again, so that the second connecting element 40 generates magnetism to attract the pastry extrusion head 60 to be used.

In another implementation mode of the first embodiment, the second connecting element 40 is, for example, an electromagnet, and the fourth connecting element 62 of the pastry extrusion head 60 is, for example, an electromagnet. When the feeding cylinder 50 is connected to the connecting seat 10 and the connecting seat 10 is connected to the pastry extrusion head 60, the fourth connecting element 62 of the pastry extrusion head 60 can be electrically connected to the second end of the conductive circuit 15 of the connecting seat 10, so as to supply electric power through the electric power supply source to the second connecting element 40 on the connecting seat 10 to generate magnetism. In other words, when the second connecting element 40 of the food extrusion temperature controllable device 100 of the invention contacts the pastry extrusion head 60, both the second connecting element 40 and the fourth connecting element 62 are capable of generating magnetism with opposite magnetic poles, for example, S pole and N pole respectively to attract the fourth connecting element 62 of the pastry extrusion head 60 to be used by magnetic force. If the pastry extrusion head 60 is to be replaced, electric power supply can be turned off first, and the second connecting element 40 and the fourth connecting element 62 can be demagnetized so that the pastry extrusion head 60 to be dismounted can be separated from the second connecting element 40, and then the food processor 200 moves a position of the food extrusion temperature controllable device 100 and electric power is supplied again, and the second connecting element 40 and the fourth connecting element 62 generate magnetism to attract the other pastry extrusion head 60 to be used.

Figure 5:
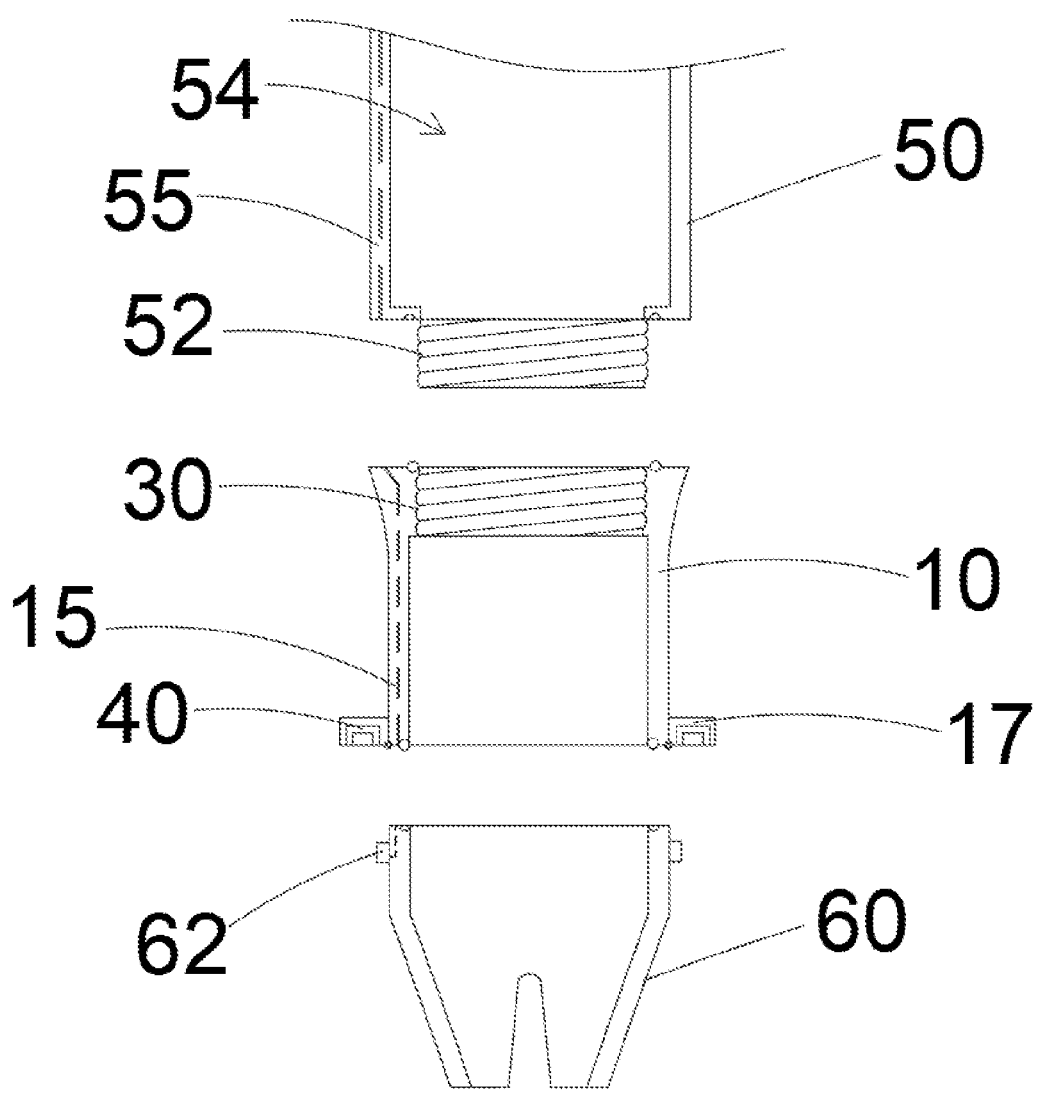
FIG. 5 is a cross-sectional side exploded view of the food extrusion temperature controllable device based on material and environment properties of a second embodiment of the invention connected to the feeding cylinder and the pastry extrusion head.
Figure 6:
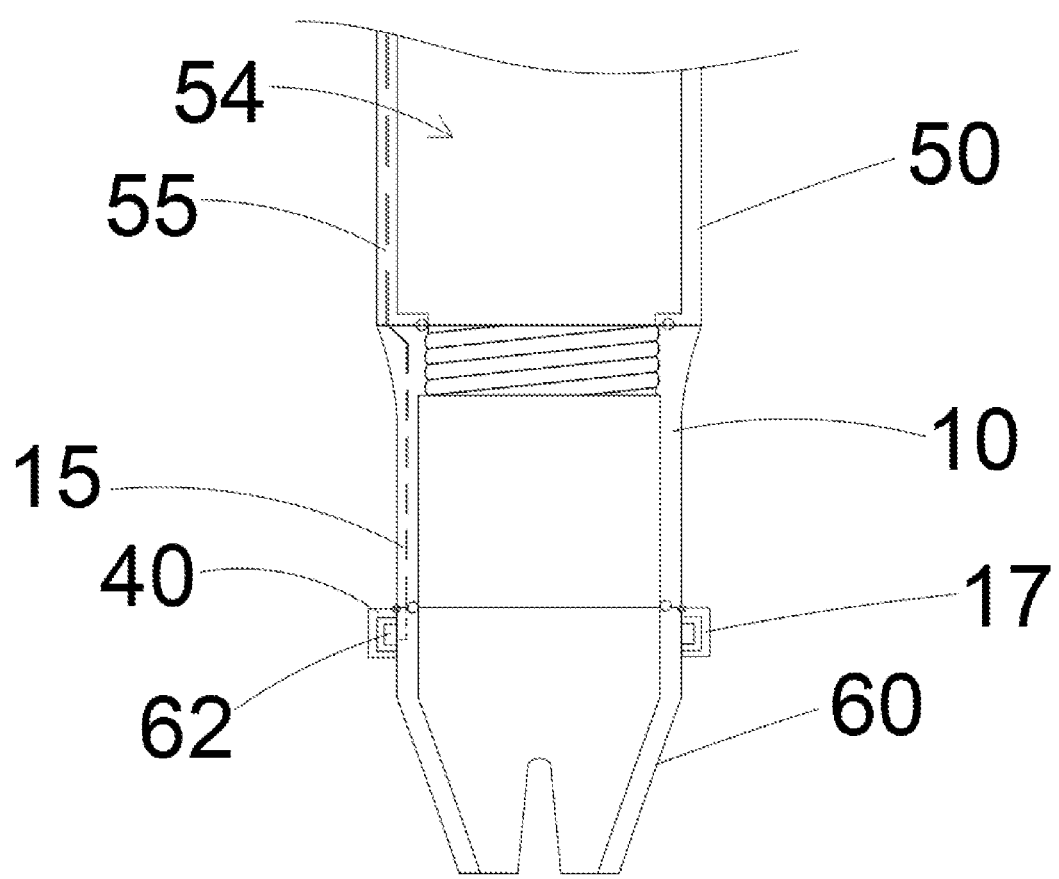
FIG. 6 is a cross-sectional side combinational view of the food extrusion temperature controllable device based on material and environment properties of the second embodiment of the invention connected to the feeding cylinder and the pastry extrusion head.

In addition, please refer to FIGS. 5 and 6. In a second embodiment of the invention, the connecting seat 10 comprises an extension plate 17 pivotally connected to a bottom side wall of the connecting seat 10, and the extension plate 17 is pivotally connected to the bottom side wall of the connecting seat 10 by penetrating a spin axis of a torsion spring. The extension plate 17 is, for example, substantially perpendicular to the side wall of the connecting seat 10 in a non-pivoting state by a restoring force of the torsion spring, so as to prevent the extension plate 17 from obstructing the connecting seat 10 to connect to the pastry extrusion head 60. Wherein, in addition to the second connecting element 40 being disposed on the bottom side of the connecting seat 10, the second connecting element 40 can also be additionally disposed on the extension plate 17 or can be modified to be disposed on the extension plate 17; in addition to the fourth connecting element 62 being disposed on a top side of the pastry extrusion head 60, the fourth connecting element 62 can also be correspondingly additionally disposed on a top side wall of the pastry extrusion head 60 or can be modified to be disposed on the top side wall of the pastry extrusion head 60, so that when the second connecting element 40 and the fourth connecting element 62 are attracted to each other by magnetic force, the extension plate 17 can be pivoted to cause the second connecting element 40 on the extension plate 17 to be magnetically attracted on the fourth connecting element 62 on the top side wall of the pastry extrusion head 60. In other words, in addition to a longitudinal magnetic attraction between the connecting seat 10 and the pastry extrusion head 60, a lateral magnetic attraction can be added or modified, so that the connecting seat 10 can be more firmly connected to the pastry extrusion head 60 to avoid falling off accidentally. In addition, a shape of the second connecting element 40 on the extension plate 17 and the fourth connecting element 62 on the top side wall of the pastry extrusion head 60 can be flat or can be a concave-convex shape, and preferably in concave-convex shapes matching with each other. When the second connecting element 40 on the extension plate 17 is magnetically attracted on the fourth connecting element 62 on the top side wall of the pastry extrusion head 60, a buckling effect can be produced to effectively avoid falling off. In a similar way, the invention is not limited to the above examples, the extension plate 17 can also be modified to be pivoted on a top end of the pastry extrusion head 60, and the second connecting element 40 can be modified to be disposed on the bottom side wall of the connecting seat 10.

Figure 7:
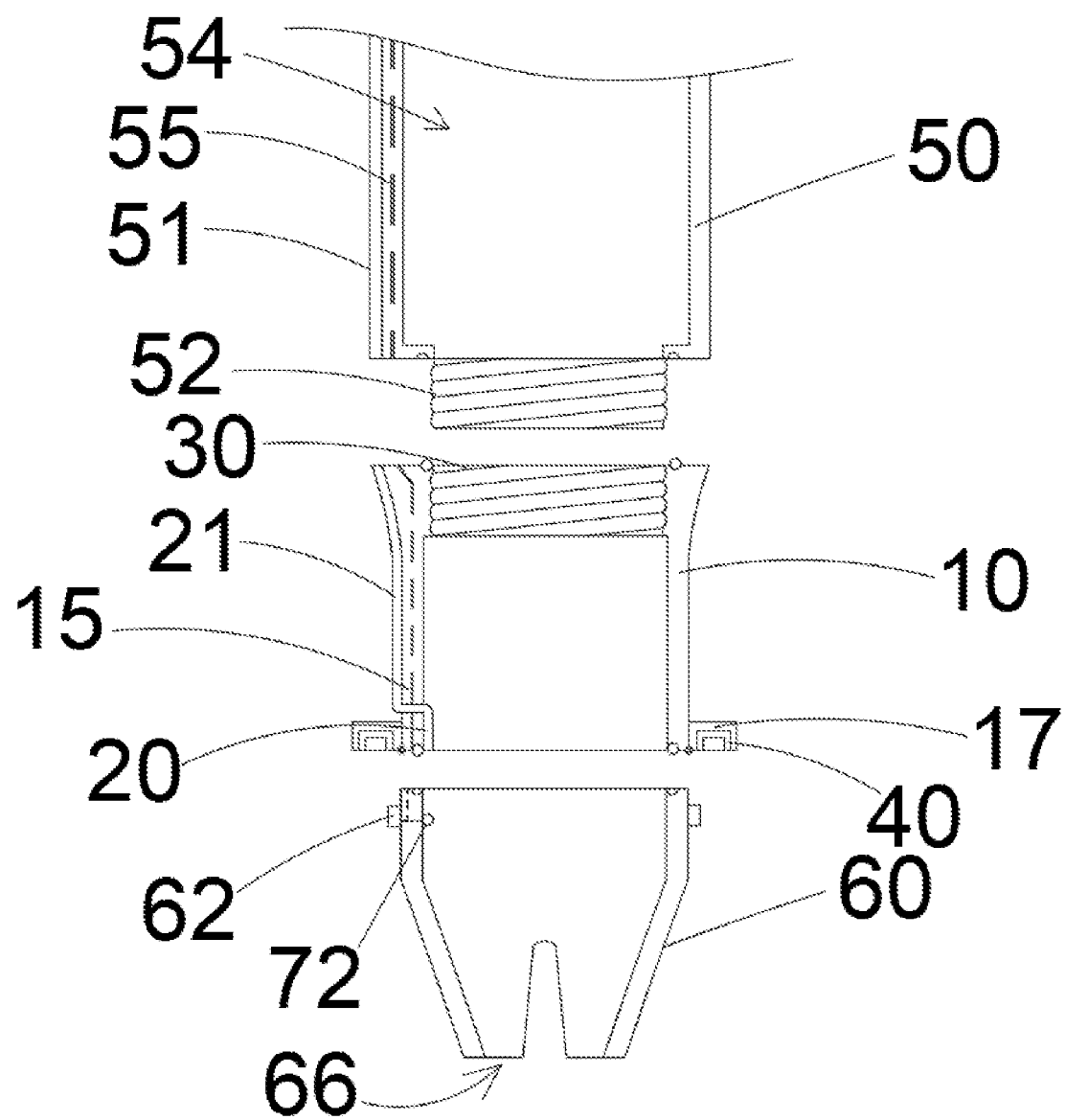
FIG. 7 is a cross-sectional side exploded view of the food extrusion temperature controllable device based on material and environment properties of a third embodiment of the invention connected to the feeding cylinder and the pastry extrusion head.

Furthermore, please refer to FIG. 7, in an implementation mode of a third embodiment of the invention, in addition to the structures described in the first embodiment and/or the second embodiment, the food extrusion temperature controllable device 100 of the invention further comprises a material removal element, for example, a spray head 20 disposed on an inner surface of the connecting seat 10 to perform a material removal process, wherein the spray head 20 preferably has a plurality of nozzles disposed around the inner surface of the connecting seat 10, and an opening direction of the nozzle is preferably facing toward a pastry tip 66 of the pastry extrusion head 60, so that a cleaning fluid such as gas or liquid can be sprayed toward the second opening 14. In addition, in another implementation mode of the third embodiment of the invention, preferably, the spray head 20 can also have a plurality of nozzles disposed around and on an outer surface of the connecting seat 10, and the opening direction of the nozzle is preferably facing toward the pastry tip 66, so as to spray gas or liquid toward the pastry tip 66. In addition, if the nozzles of the spray head 20 are located on the inner surface of the connecting seat 10, the opening direction of the nozzle of the spray head 20 is, for example, parallel to a tangential direction of the inner surface of the connecting seat 10 and disposed on the inner surface of the connecting seat 10 at an included angle facing downward, by generating a fluid vortex that rotates downward along the inner surface of the connecting seat 10, food ingredients remaining on the pastry tip 66 of the pastry extrusion head 60 can be effectively removed. Wherein, the downwardly-facing included angle is approximately between 0 degrees and 90 degrees, and preferably 45 degrees.

Wherein, the nozzles of the spray head 20 can be communicated with each other through a fluid pipeline 21, and communicated to a fluid supply source (not shown in the figures) through the fluid pipeline 21, wherein the fluid supply source is electrically connected to the controller 400, thereby providing a high-pressure gas according to a cleaning command of the controller 400, a pressure value is approximately greater than 10 kg per square centimeter, so that the high-pressure gas is ejected from the nozzles of the spray head 20 to remove residual food ingredients remaining on an inner surface and/or an outer surface of the pastry tip 66 of the pastry extrusion head 60. Wherein, a time span for the nozzles of the spray head 20 to spray a liquid can be, for example, approximately between 1 and 10 seconds. Preferably, the fluid supply source of the invention can also spray high-pressure liquid and gas in sequence, for example, a high-pressure liquid is supplied to the spray head 20 through the fluid pipeline 21, so as to spray the high-pressure liquid from the nozzles of the spray head 20 to remove residual food ingredients remaining on the inner surface and/or the outer surface of the pastry tip 66 of the pastry extrusion head 60, and then a high-pressure gas can be supplied to the spray head 20 through the fluid pipeline 21, and the high-pressure gas is ejected to dry a liquid remaining on the pastry tip 66 of the pastry extrusion head 60, thereby the pastry tip 66 of the pastry extrusion head 60 can be cleaned and dried for subsequent processes. For example, in the invention, the above-mentioned material removal process can be performed after the pastry extrusion head 60 is magnetically attracted, and then an extrusion process can be performed. Alternatively, in the invention, after the extrusion process is completed, the above-mentioned material removal process can be performed first, and then a disposition process of the pastry extrusion head 60 can be performed. Wherein, a time span for the nozzles of the spray head 20 to spray a gas can be, for example, approximately between 1 and 10 seconds. In addition, the nozzles of the spray head 20 of the invention can spray high-pressure liquid and gas alternately, for example, first spray a high-pressure liquid for a time span of approximately between 1-10 seconds, and then spray a high-pressure gas for a time span of approximately between 1-10 seconds, and then a high-pressure liquid is sprayed for a time span of approximately between 1-10 seconds, and so on, and finally a high-pressure gas is sprayed for a time span of approximately between 1-10 seconds, which is capable of effectively removing food ingredients remaining on the pastry tip 66 of the pastry extrusion head 60, and drying the pastry tip 66 of the pastry extrusion head 60. In addition, the feeding cylinder 50 can further have, for example, a fluid pipeline 51, and one end of the fluid pipeline 51 is communicated to the fluid supply source. When the connecting seat 10 is connected to the feeding cylinder 50, the fluid pipeline 21 of the connecting seat 10 can be moved to a position corresponding to the fluid pipeline 51 of the feeding cylinder 50, so that the fluid pipeline 21 of the connecting seat 10 is communicated to the fluid pipeline 51 of the feeding cylinder 50, thereby a fluid supplied by the fluid supply source can be sprayed out from the nozzles of the spray head 20.

For example, the food extrusion temperature controllable device 100 of the invention can further have, for example, a detection element 72 disposed on the pastry tip 66 of the pastry extrusion head 60, and the detection element 72 is electrically connected to the controller 400, for example, through the aforementioned method. In the material removal process, after the nozzles of the spray head 20 spray liquid and gas to remove food ingredients remaining on the pastry tip 66 of the pastry extrusion head 60, the detection element 72 can detect whether there is food ingredient remaining on the pastry tip 66 of the pastry extrusion head 60, if there is food ingredient, the detection element 72 can generate a detection result signal to the controller 400, wherein the controller 400 is capable of generating a cleaning command based on the detection result signal, after the fluid supply source receives the cleaning command, the fluid supply source can supply a fluid to the spray head 20, so that the spray head 20 can perform the material removal process again. Wherein, the detection element 72 is not limited to an optical sensor, an electronic sensor, or an image sensor, etc., as long as it can be used to determine whether there is food ingredient remaining on the pastry tip 66 of the pastry extrusion head 60, it can be applied to the invention. For the optical sensor, the detection element 72, for example, can be disposed at any position of the pastry tip 66 of the pastry extrusion head 60, by determining whether light is interrupted by food ingredients, whether the material removal process of the pastry tip 66 of the pastry extrusion head 60 is successful can be determined; if removal is not successful, the material removal process can be performed again.

Figure 8:
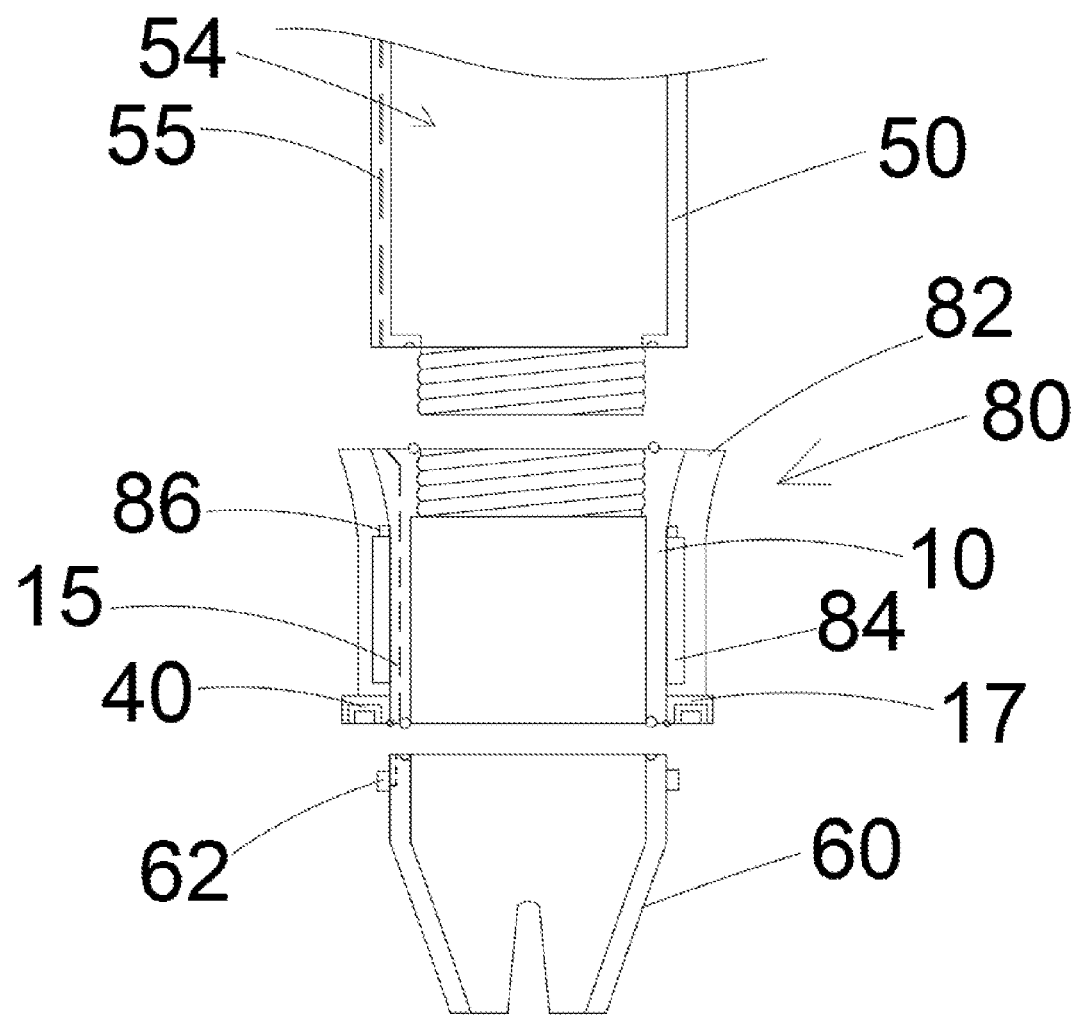
FIG. 8 is a cross-sectional side exploded view of the food extrusion temperature controllable device based on material and environment properties of a fourth embodiment of the invention connected to the feeding cylinder and the pastry extrusion head.

Please refer to FIG. 8, in a fourth embodiment of the invention, in addition to the structures exemplified in the first, second, and/or third embodiments, the food extrusion temperature controllable device 100 of the invention, for example, can further have a temperature controllable device 80 disposed on the connecting seat 10, and in order to be applicable to food ingredients with various temperature properties, such as chocolate, cream or syrup, etc., the temperature controllable device 80 at least has a temperature regulating element 84, the temperature regulating element 84 is composed of a heater capable of raising temperature and/or a cooler capable of lowering temperature. The temperature regulating element 84 is disposed on the connecting seat 10, and is preferably disposed around an inner side or an outer side of the connecting seat 10. In an actual extrusion process, the controller 400 preferably generates a corresponding temperature controllable command according to temperature properties of a food ingredient. The temperature controllable device 80 of the invention is preferably capable of receiving a temperature controllable command from the controller 400 to control a temperature of the connecting seat 10 to be between 0° C. and 60° C. to match the temperature characteristics of the food ingredient.

As mentioned above, the feeding cylinder 50 and the connecting seat 10 can be respectively disposed with a conductive circuit. The first end of the conductive circuit 15 of the connecting seat 10 is electrically connected to the second connecting element 40, and the first end of the conductive circuit 55 of the feeding cylinder 50 is electrically connected to the electric power supply source (not shown in the figures). When the feeding cylinder 50 is connected to the connecting seat 10, the second end of the conductive circuit 15 of the connecting seat 10 can be in contact with and electrically connected to the second end of the conductive circuit 55 of the feeding cylinder 50, so that the electric power supply source is capable of supplying electric power to the heater and the cooler of the temperature controllable device 80 on the connecting seat 10 to adjust a temperature of a food ingredient passing through the connecting seat 10 via the feeding cylinder 50.

In addition, in order to obtain a better temperature control effect, the temperature controllable element 80 of the invention can further comprise, for example, a thermal insulation jacket 82, wherein the thermal insulation jacket 82 has a double-layer fabric structure with a room, and inside the room is filled with a thermal insulation material. The thermal insulation jacket 82 is used to detachably annularly cover the side wall of the connecting seat 10, and preferably further annularly cover the side wall of the pastry extrusion head 60, or even further cover a side wall of the feeding cylinder 50, for example. Wherein, an outer shape of the thermal insulation jacket 82 can be, for example, a plate shape, and two ends of the thermal insulation jacket 82 have corresponding fasteners, such as buttons, for fastening or buckling with each other.

In addition, the temperature controllable device 80 of the invention, for example, further comprises a temperature sensor 86 disposed on the connecting seat 10 to detect a temperature of a food ingredient in the connecting seat 10 and transmit a temperature sensing signal to the controller 400, thereby the controller 400 generating a corresponding temperature controllable command to cause the temperature regulating element 84 adjust a temperature according to the temperature controllable command of the controller 400. If a temperature of a food ingredient reaches a set temperature, the temperature regulating element 84 stops operating; if the temperature is lower or higher than the set temperature, the heater or the cooler of the temperature regulating element 84 performs corresponding operations to adjust the temperature.

In addition, besides the temperature controllable device 80 of the invention being disposed on the connecting seat 10, the invention can further have the temperature controllable devices 80 disposed on the feeding cylinder 50 and/or the pastry extrusion head 60, for example, thereby the temperature controllable devices 80 are not limited to only capable of controlling the feeding cylinder 50, the connecting seat 10 and the pastry extrusion head 60 at a same temperature, that is, the temperature controllable devices 80 are also capable of controlling the feeding cylinder 50, the connecting seat 10 and the pastry extrusion head 60 at different temperatures according to the temperature controllable command of the controller 400 to meet temperature properties of a food ingredient. For example, the melting point of chocolate is 29 degrees Celsius, but the storage temperature is 12 to 18 degrees Celsius. Therefore, if the food extrusion temperature controllable device 100 based on material and environment properties of the invention is applied to extrusion of chocolate, for example, a temperature of the feeding cylinder 50 can be controlled to be between 12 degrees Celsius and 18 degrees Celsius, a temperature of the connecting seat 10 is controlled to be between 18 degrees Celsius and 29 degrees Celsius, and a temperature of the pastry extrusion head 60 is controlled to be above 29 degrees Celsius.

Figure 9:
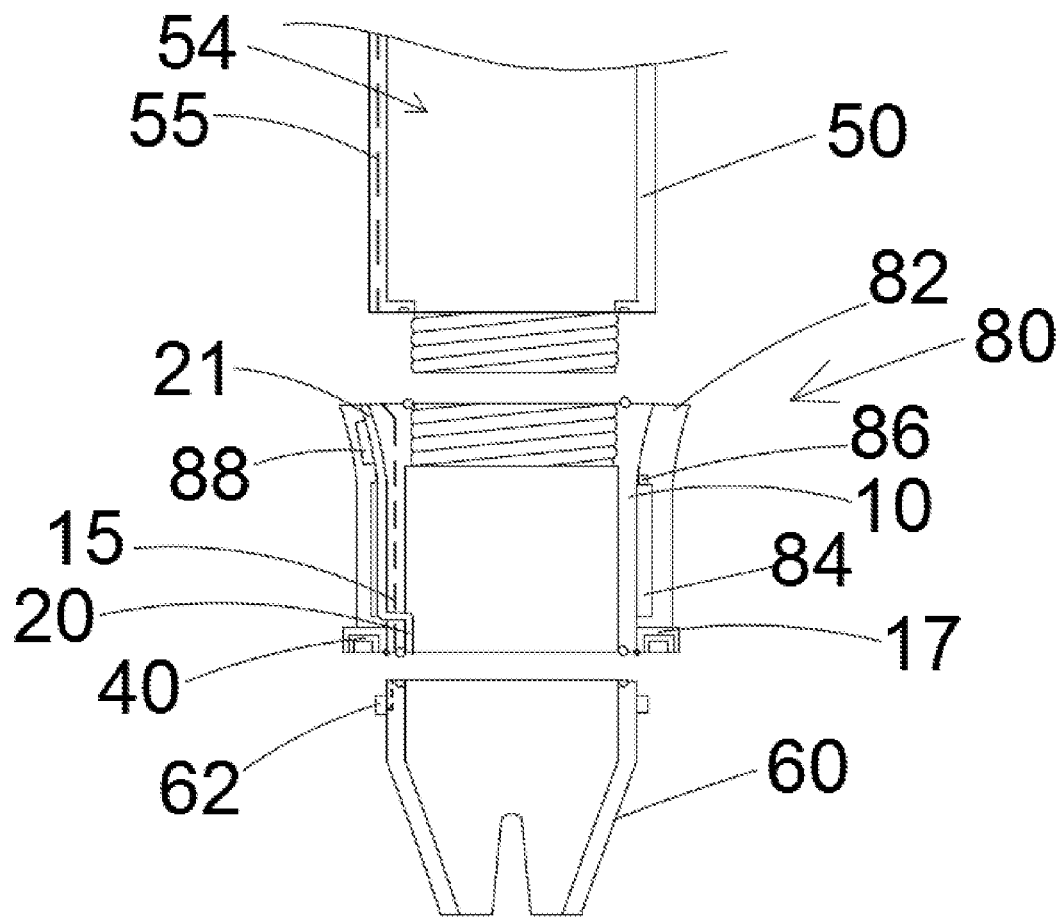
FIG. 9 is a cross-sectional side exploded view of the food extrusion temperature controllable device based on material and environment properties of a fifth embodiment of the invention connected to the feeding cylinder and the pastry extrusion head.

Please refer to FIG. 9, in a fifth embodiment of the invention, in addition to the structures exemplified in the first, second, third, and/or fourth embodiments, the food extrusion temperature controllable device 100 of the invention, for example, can further have a heating element 88 disposed on the fluid pipeline 21 to heat a fluid in the fluid pipeline 21. The heated fluid is capable of easily removing food ingredients with various temperature properties remaining on the pastry extrusion head 60 and capable of drying the pastry extrusion head 60 quickly. A temperature of the fluid sprayed from the nozzles of the spray head 20 of the invention is between 25 degrees Celsius and 100 degrees Celsius, and preferably between 35 degrees Celsius and 75 degrees Celsius. For example, if chocolate on the pastry extrusion head 60 is to be removed, the fluid is heated to a temperature higher than the melting point of the chocolate, for example, higher than 29 degrees Celsius. Although in FIG. 9 the heating element 88 is additionally disposed in the fourth embodiment as an example, the heating element 88 can also be additionally disposed in the first embodiment to the third embodiment of the invention. Wherein, the heating element 88 is electrically connected to the controller 400 and is composed of an electric heater capable of raising a temperature, so the temperature can be adjusted by the control of the controller 400.

In summary, the food extrusion temperature controllable device based on material and environment properties of the invention can have one or more of the following advantages: (1) The pastry extrusion head of various forms can be installed or disassembled more quickly by magnetic attraction to reduce the time required for an overall food preparation. (2) The pastry extrusion head can be easily disposed in the pastry extrusion head placement rack without the need for additionally installing fixing devices. (3) With the pivotally connected extension plate, the connecting seat and the pastry extrusion head can be connected by magnetic attraction and snap-on at the same time. (4) Provided with the spray head capable of spraying liquid and gas for cleaning and drying the pastry extrusion head. (5) Provided with the temperature controllable device capable of adjusting to a required temperature according to food ingredient and environment properties.

Note that the specification relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A food extrusion temperature controllable device based on material and environment properties applicable that connects with a feeding cylinder and a pastry extrusion head of a food processor that adjusts a temperature of a food ingredient supplied by the feeding cylinder and that sprays the food ingredient from a pastry tip of the pastry extrusion head, the food extrusion temperature controllable device based on material and environment properties comprising:

a connecting seat having a chamber, the chamber penetrating a top side and a bottom side of the connecting seat to form a first opening and a second opening respectively, wherein the connecting seat is a ring structure and an interior of the ring structure is hollow;

a first connecting element disposed on the top side of the connecting seat, wherein the first connecting element is connected to a third connecting element of the feeding cylinder;

a second connecting element disposed on the bottom side of the connecting seat, wherein the food extrusion temperature controllable device based on material and environment properties installs the pastry extrusion head by a magnetic attraction, which causes a buckling effect, between the second connecting element and a fourth connecting element of the pastry extrusion head, or dismounts the pastry extrusion head from the food extrusion temperature controllable device by demagnetization, which causes removing of the buckling effect and dropping of the pastry extrusion head into a pastry extrusion head placement rack, between the second connecting element and the fourth connecting element of the pastry extrusion head, wherein the connecting seat further comprises an extension plate pivotally connected to a bottom side wall of the connecting seat, the second connecting element is disposed on the extension plate, the fourth connecting element is disposed on a top side wall of the pastry extrusion head, the second connecting element and the fourth connecting element have concave-convex shapes matching with each other to produce the buckling effect, wherein when the second connecting element and the fourth connecting element are attracted to each other by the magnetic attraction, the extension plate is pivoted to cause the buckling effect between the second connecting element and the fourth connecting element on the top side wall of the pastry extrusion head, wherein when the second connecting element and the fourth connecting element are not attracted to each other by the demagnetization, the extension plate is substantially perpendicular to the bottom side wall of the connecting seat in a non-pivoting state, which causes removing of the buckling effect and dropping of the pastry extrusion head into the pastry extrusion head placement rack;

at least one temperature controllable device disposed on the connecting seat that adjusts a temperature of the food ingredient passing through the connecting seat according to temperature properties of the food ingredient;

a material removal element, which is a spray head, and the spray head has a plurality of nozzles disposed around an inner surface and an outer surface of the connecting seat, an opening direction of each of the nozzles is facing toward the pastry tip of the pastry extrusion head that performs a material removal process that sprays a fluid toward the pastry tip of the pastry extrusion head, the fluid being liquid and gas sequentially that easily removes the food ingredient remaining on an inner surface and an outer surface of the pastry tip of the pastry extrusion head and quickly drying the pastry tip of the pastry extrusion head, wherein the opening direction of each of the nozzles of the spray head is parallel to a tangential direction of the inner surface of the chamber of the connecting seat and disposed on the inner surface of the chamber of the connecting seat at an included angle facing downward, so that the fluid sprayed toward the pastry tip of the pastry extrusion head forms a fluid vortex that rotates downward along the inner surface of the connecting seat; and a detection element disposed on the pastry tip of the pastry extrusion head, the detection element detects whether there is the food ingredient remaining on the pastry tip of the pastry extrusion head, if there is the food ingredient, the detection element generates a detection result signal to a controller, wherein the controller generates a cleaning command based on the detection result signal, after a fluid supply source receives the cleaning command, the fluid supply source supplies the fluid to the spray head such that the spray head performs the material removal process again.

2. The food extrusion temperature controllable device based on material and environment properties as claimed in claim 1, wherein the temperature controllable device comprises a temperature regulating element composed of a heater and a cooler.

3. The food extrusion temperature controllable device based on material and environment properties as claimed in claim 2, wherein the temperature regulating element is electrically connected to an electric power supply source via a conductive circuit of the feeding cylinder.

4. The food extrusion temperature controllable device based on material and environment properties as claimed in claim 1, wherein the temperature controllable device further comprises a temperature sensor to detect the temperature of the food ingredient passing through the connecting seat.

5. The food extrusion temperature controllable device based on material and environment properties as claimed in claim 1, wherein the temperature controllable element further comprises a thermal insulation jacket used to detachably annularly cover a side wall of the connecting seat.

6. The food extrusion temperature controllable device based on material and environment properties as claimed in claim 5, wherein the thermal insulation jacket further covers a side wall of the feeding cylinder and a side wall of the pastry extrusion head annularly.

7. The food extrusion temperature controllable device based on material and environment properties as claimed in claim 1, wherein a quantity of the temperature controllable element is more than one, and the temperature controllable elements are disposed on the connecting seat, the feeding cylinder and the pastry extrusion head respectively to adjust temperatures of the food ingredient passing through the connecting seat, the feeding cylinder and the pastry extrusion head.

8. The food extrusion temperature controllable device based on material and environment properties as claimed in claim 7, wherein the temperatures of the food ingredient in the connecting seat, the feeding cylinder and the pastry extrusion head are the same or different.

9. The food extrusion temperature controllable device based on material and environment properties as claimed in claim 1, further comprising a heating element disposed on the connecting seat that heats the fluid sprayed by the material removal element.

10. The food extrusion temperature controllable device based on material and environment properties as claimed in claim 1, wherein the detection element is an optical sensor, an electronic sensor, or an image sensor.

11. The food extrusion temperature controllable device based on material and environment properties as claimed in claim 1, wherein the feeding cylinder, the connecting seat and the pastry extrusion head are controlled by the temperature controllable device at a same temperature.

12. The food extrusion temperature controllable device based on material and environment properties as claimed in claim 1, wherein the feeding cylinder, the connecting seat and the pastry extrusion head are controlled by the temperature controllable device at different temperatures.

\* \* \* \* \*